(12) United States Patent
Jordan et al.

(10) Patent No.: US 8,863,611 B2
(45) Date of Patent: Oct. 21, 2014

(54) BICYCLE CONTROL DEVICE

(75) Inventors: Brian Jordan, Chicago, IL (US); Christopher Shipman, Chicago, IL (US)

(73) Assignee: SRAM, LLC, Chicago, IL (US)

(*) Notice: Subject to any disclaimer, the term of this patent is extended or adjusted under 35 U.S.C. 154(b) by 160 days.

(21) Appl. No.: 12/247,752

(22) Filed: Oct. 8, 2008

(65) Prior Publication Data

US 2010/0083788 A1 Apr. 8, 2010

(51) Int. Cl.
| | |
|---|---|
| *B62M 25/04* | (2006.01) |
| *B62K 23/06* | (2006.01) |
| *B60T 7/10* | (2006.01) |
| *B60T 11/04* | (2006.01) |

(52) U.S. Cl.
CPC .............. *B62M 25/04* (2013.01); *B60T 7/102* (2013.01); *B60T 11/046* (2013.01); *B62K 23/06* (2013.01)
USPC ........................................ 74/502.2

(58) Field of Classification Search
USPC ................. 74/500.5, 501.6, 502.2, 488, 489, 74/473.14
IPC ....................................................... B62M 25/04
See application file for complete search history.

(56) References Cited

U.S. PATENT DOCUMENTS

| | | | |
|---|---|---|---|
| 3,972,247 A | 8/1976 | Armstrong | |
| 4,002,350 A * | 1/1977 | Timbs | 280/236 |
| 4,548,092 A * | 10/1985 | Strong, Jr. | 74/473.14 |
| 5,241,878 A | 9/1993 | Nagano | |
| 5,400,675 A | 3/1995 | Nagano | |
| 5,775,168 A * | 7/1998 | Furuta | 74/489 |
| 6,647,823 B2 * | 11/2003 | Tsumiyama et al. | 74/501.6 |
| 6,691,591 B2 | 2/2004 | Tsumiyama et al. | |
| 7,527,137 B1 | 5/2009 | Calendrille, Jr. | |
| 7,918,145 B1 | 4/2011 | Calendrille | |
| 2006/0207375 A1* | 9/2006 | Jordan et al. | 74/489 |
| 2006/0272443 A1* | 12/2006 | Tsumiyama | 74/502.2 |
| 2008/0115616 A1* | 5/2008 | Chiang | 74/502.2 |
| 2008/0196537 A1* | 8/2008 | Dal Pra' | 74/502.2 |
| 2009/0139361 A1 | 6/2009 | Watarai | |

FOREIGN PATENT DOCUMENTS

| | | |
|---|---|---|
| EP | 1 535 829 A | 6/2005 |
| EP | 1 698 550 A | 9/2006 |
| EP | 1 783 044 A | 5/2007 |
| EP | 1 955 937 A | 8/2008 |
| EP | 2 065 298 A | 6/2009 |
| FR | 2 705 079 A1 | 11/1994 |
| JP | 4-331689 | 11/1992 |

* cited by examiner

*Primary Examiner* — Thomas Diaz
(74) *Attorney, Agent, or Firm* — Milan Milosevic; Lisa Serdynski; Steven Courtright

(57) ABSTRACT

A bicycle control device includes a lever for actuating a brake control mechanism and a shift control mechanism in a cable-release direction and a cable-pull direction. The lever is rotatable about a brake axis to actuate the brake control mechanism and rotatable about a shift axis to actuate the shift control mechanism in the cable-release direction and in the cable-pull direction. The bicycle control device is configured to not displace the shift control mechanism upon actuation of the brake control mechanism.

13 Claims, 8 Drawing Sheets

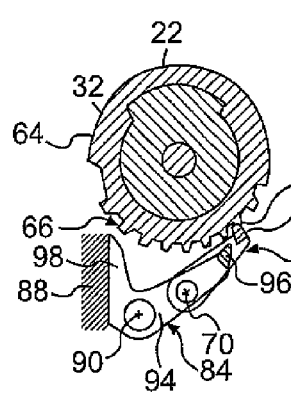
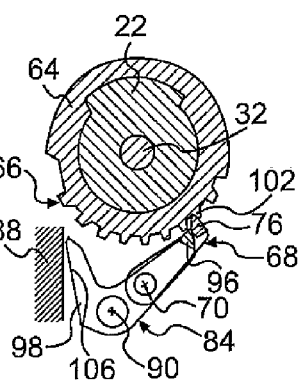
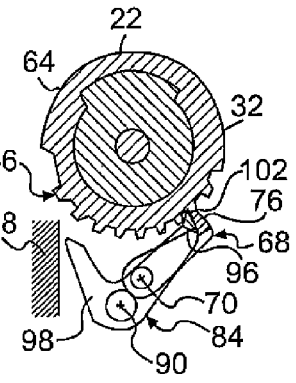
FIG. 8a　　　FIG. 8b　　　FIG. 8c
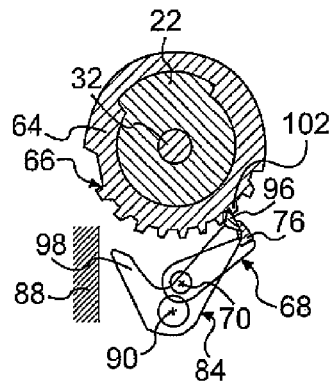
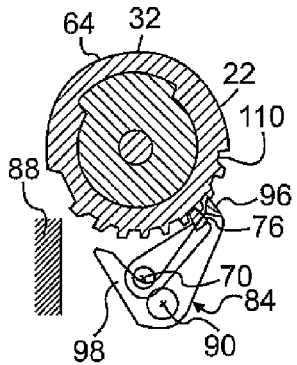
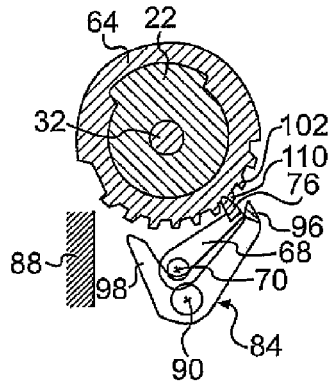
FIG. 8d　　　FIG. 8e　　　FIG. 8f
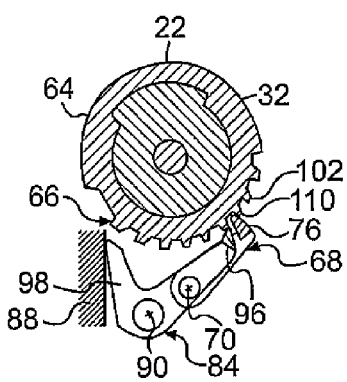
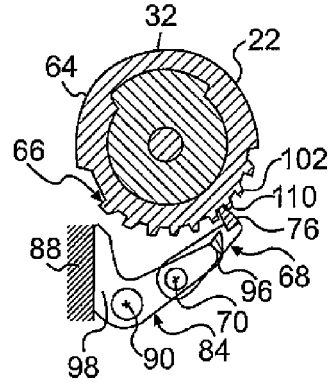
FIG. 8g　　　FIG. 8h

BICYCLE CONTROL DEVICE

BACKGROUND OF THE INVENTION

The present invention relates to bicycles and more particularly to a bicycle control device that includes a lever for actuating a shift control mechanism and a brake control mechanism.

SUMMARY OF THE INVENTION

The present invention provides a bicycle control device that includes a lever for actuating a shift control mechanism and a brake control mechanism. The lever is rotatable about a brake axis to actuate the brake control mechanism and rotatable about a shift axis to actuate the shift control mechanism in a cable-release direction and in a cable-pull direction. In one embodiment of the present invention, the bicycle control device is configured to not displace the shift control mechanism upon actuation of the brake control mechanism. The lever is movable in a shift direction to actuate the shift control mechanism in the cable-release direction and the cable-pull direction. The lever is movable in a brake direction to actuate the brake control mechanism.

In another embodiment of the present invention, the lever is movable in the shift direction from a rest position for a first shift movement to actuate the shift control mechanism in the cable-release direction. The lever is movable in the shift direction from the rest position for a second shift movement to actuate the shift control mechanism in the cable-pull direction. The second shift movement is greater than the first shift movement.

In another embodiment of the present invention, the bicycle control device is configured to not actuate the brake control mechanism upon actuation of the shift control mechanism. The lever includes a brake cable receiving portion for receiving an end portion of a brake cable. The shift axis substantially intersects the brake cable receiving portion. The brake axis is substantially perpendicular to the shift axis.

These and other features of the present invention will be more fully understood from the following description of one or more embodiments of the invention, taken together with the accompanying drawings.

BRIEF DESCRIPTION OF THE DRAWINGS

In the drawings:

FIGS. 8a-8h are cross-sectional views of the holding mechanism and the drive mechanism at different stages of a cable-pull operation.

DETAILED DESCRIPTION

Figure 1:
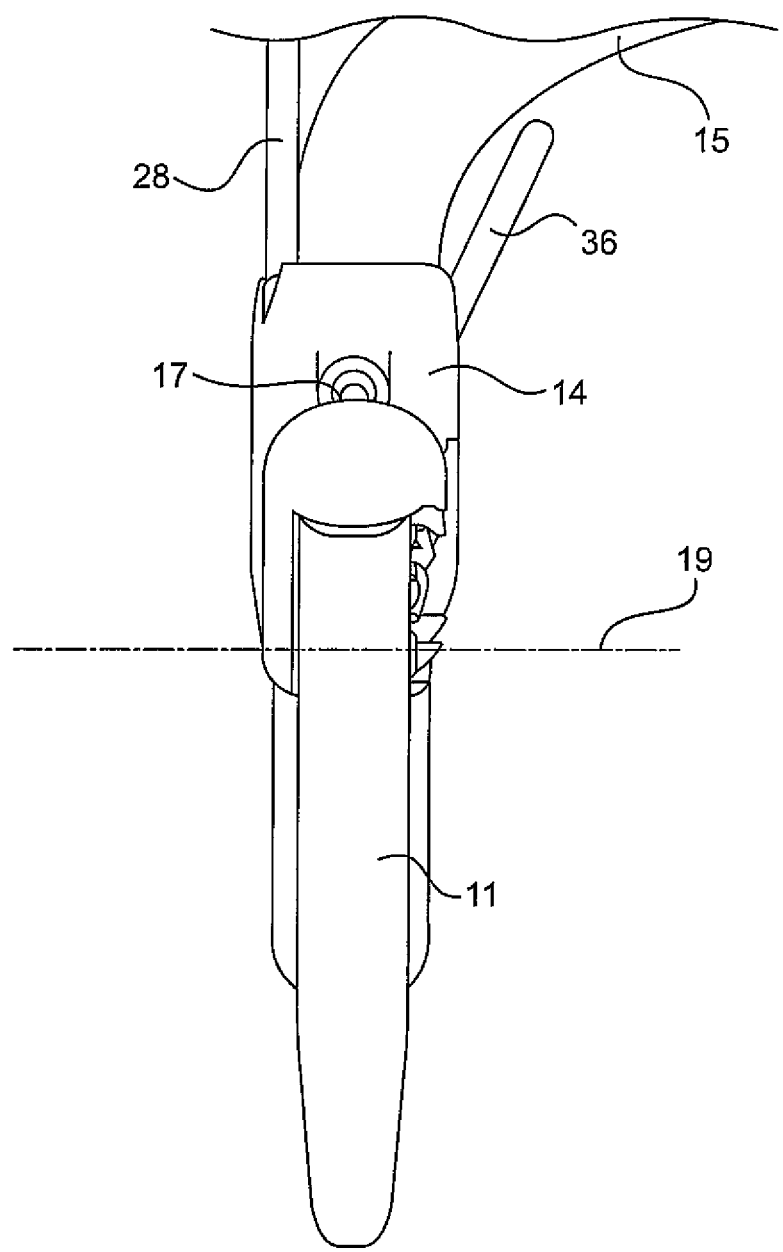
FIG. 1 is front view of a bicycle control device according to one embodiment of the present invention.

FIGS. 1-8 illustrate a bicycle control device 10 according to one embodiment of the present invention. The bicycle control device 10 generally includes a shift control mechanism 12, a brake control mechanism 13 and a lever 11 for actuating both the shift control mechanism 12 and the brake control mechanism 13. The bicycle control device 10 includes a housing 14 mountable to a handlebar 15 by a clamp 16 and a bolt 17. The bicycle control device 10 is shown mounted to the handlebar 15 for a road bike. However, similar bicycle control devices may be adapted for use on other types of bicycles, including mountain bikes.

Figure 2:
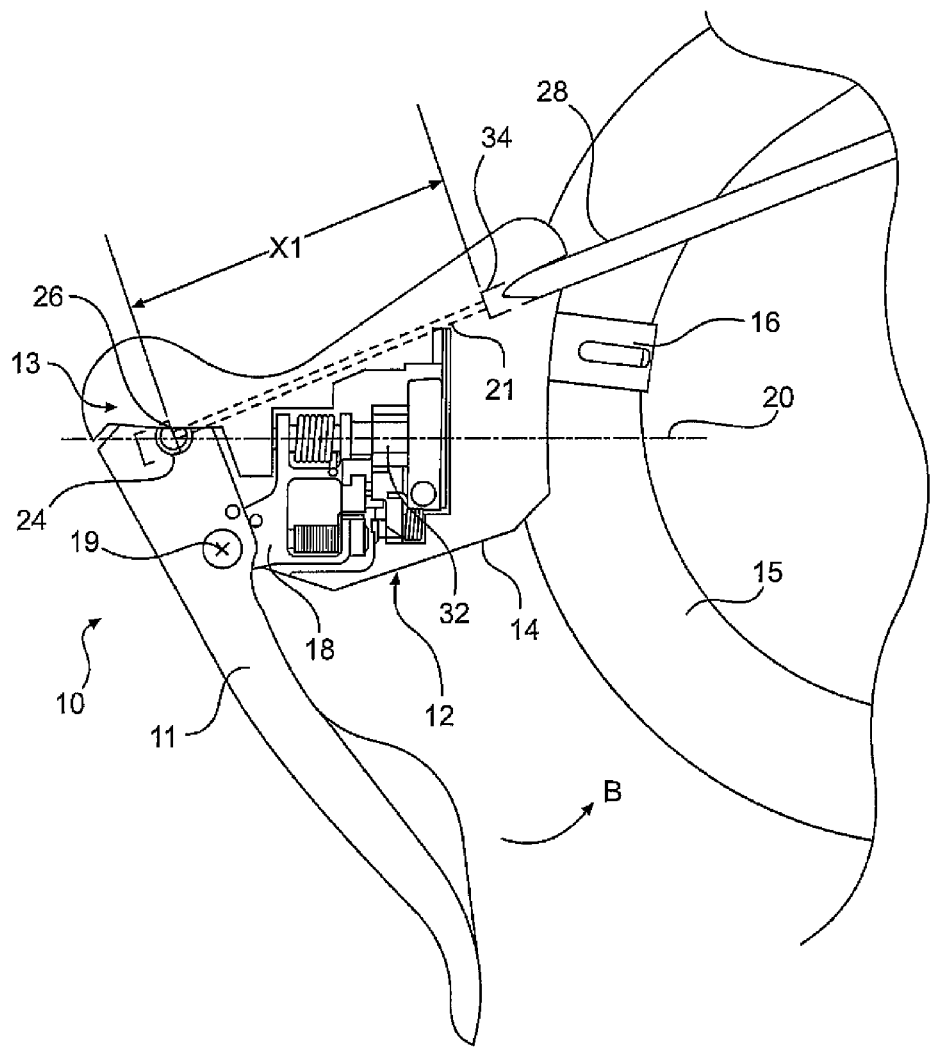
FIG. 2 is a side view of the bicycle control device of FIG. 1 showing a lever in a rest position.
Figure 3:
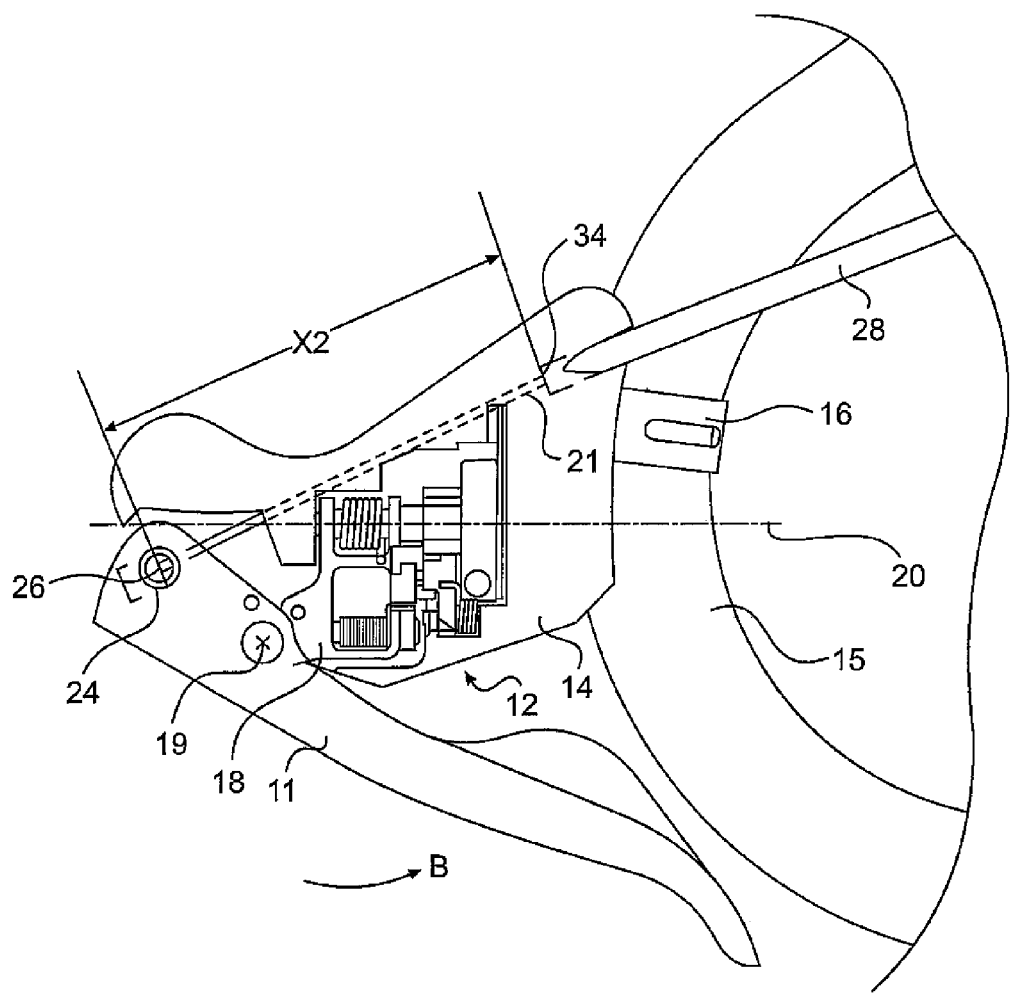
FIG. 3 is a side view of the bicycle control device of FIG. 1 showing the lever actuated in a brake direction.

Looking to FIGS. 1-3, the lever 11 is rotatably mounted to a bracket 18 about a brake axis 19. The bracket 18 is rotatably mounted to the housing 14 about a shift axis 20, in this embodiment, a shaft 32 extending through the housing 14. In the present embodiment, the brake axis 19 is substantially perpendicular to the shift axis 20. The lever 11 includes a brake cable receiving portion 24 for receiving an end portion 26 of a brake cable 21 of the brake control mechanism 13. The shift axis 20 is configured to substantially intersect the brake cable receiving portion 24. Another end of the brake cable is attached to a brake mechanism (not shown). The brake cable 21 is slidably received in a brake cable housing 28. The brake cable housing 28 exits the housing 14 substantially tangent to the handlebar 15, allowing the brake cable housing 28 to be easily taped to the handlebar 15. When the lever 11 is in a rest position (FIGS. 1 and 2), the length of the brake cable 21 between an end 34 of the cable housing 28 and the brake cable end portion 26 is ×1. Looking to FIG. 3, when the lever 11 is moved in a brake direction B toward the handlebar 15 to actuate the brake cable 21, the length of the brake cable 21 between the cable housing end 34 and the brake cable end portion 26 increases to ×2. The lever 11 is biased toward the rest position. As can be seen in FIG. 3, the shift control mechanism 12 is not displaced during actuation of the brake control mechanism 13 by motion of the lever 11 in the brake direction B.

Figure 4:
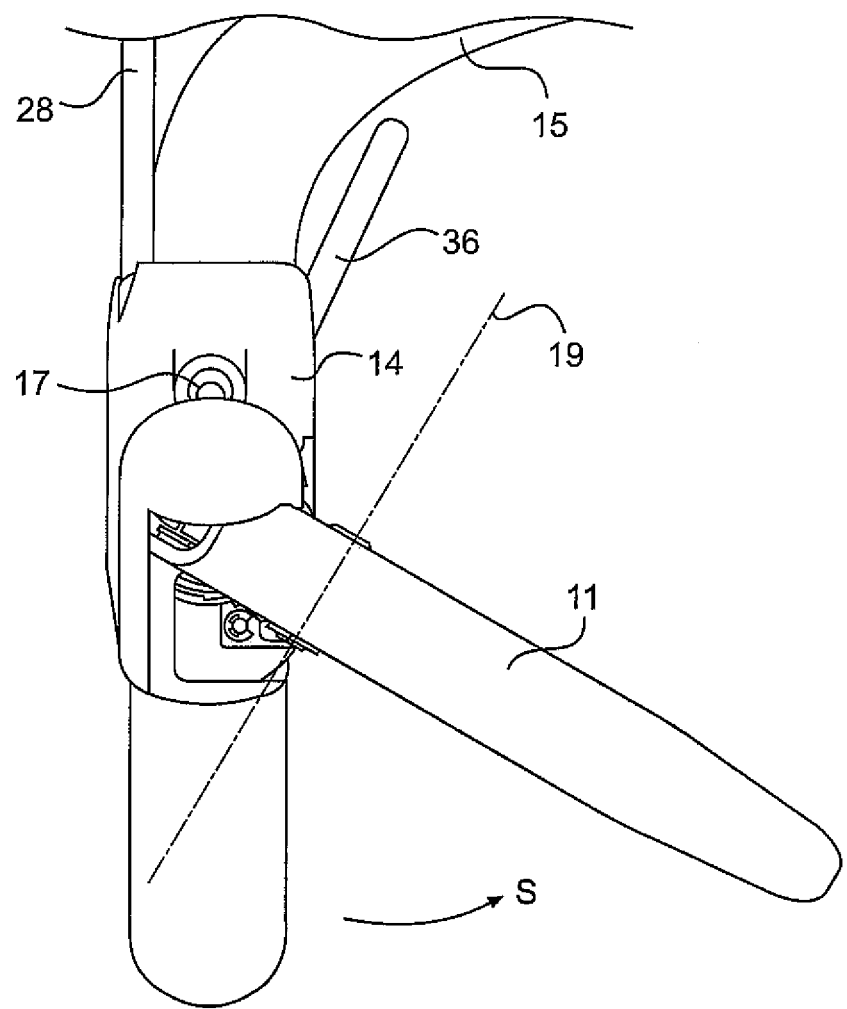
FIG. 4 is a front view of the bicycle control device of FIG. 1 showing the lever actuated in a shift direction.
Figure 5:
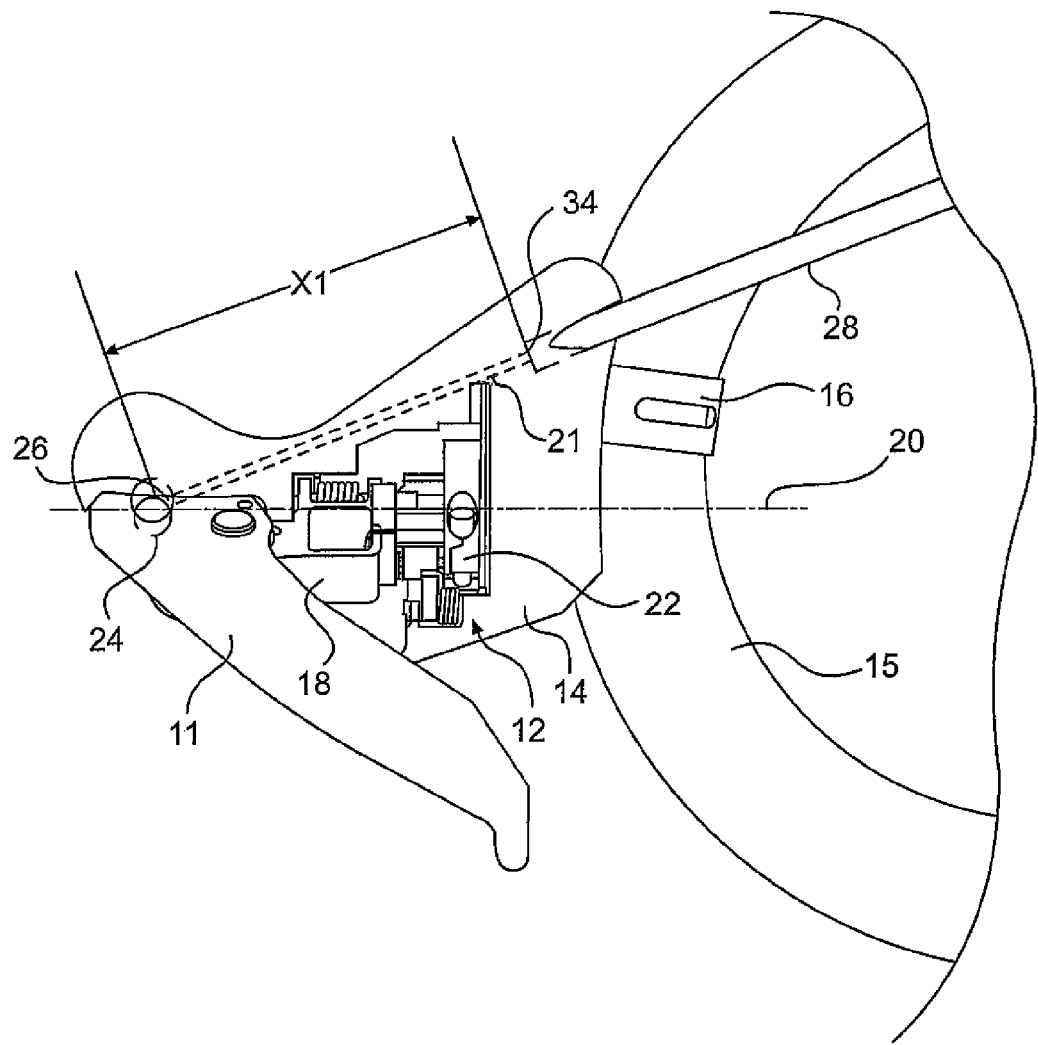
FIG. 5 is a side view of the bicycle control device of FIG. 1 showing the lever actuated in the shift direction.

Looking to FIGS. 4 and 5, the lever 11 is moved in a shift direction S to actuate the shift control mechanism 12 to pull or release a shift cable 36 connected to a gear change mechanism (not shown) to shift between various gear positions. The gear change mechanism may be a derailleur, or other external or internal gear change mechanism. Looking to FIGS. 4-6, the shift control mechanism 12 generally includes a takeup member 22, a ratchet wheel 64, a holding mechanism 40 and a drive mechanism 42. The takeup member 22, in this embodiment a spool, is rotatably mounted on the shaft 32 extending through the housing. The takeup member 22 includes a groove 44 along its periphery, for windably receiving the shift cable 36. The takeup member 22 is biased in the cable-release direction by tension in the shift cable 36 and by a takeup member return spring 46. The takeup member return spring 46 operatively connects the takeup member 22 to the housing 14.

Figure 6:
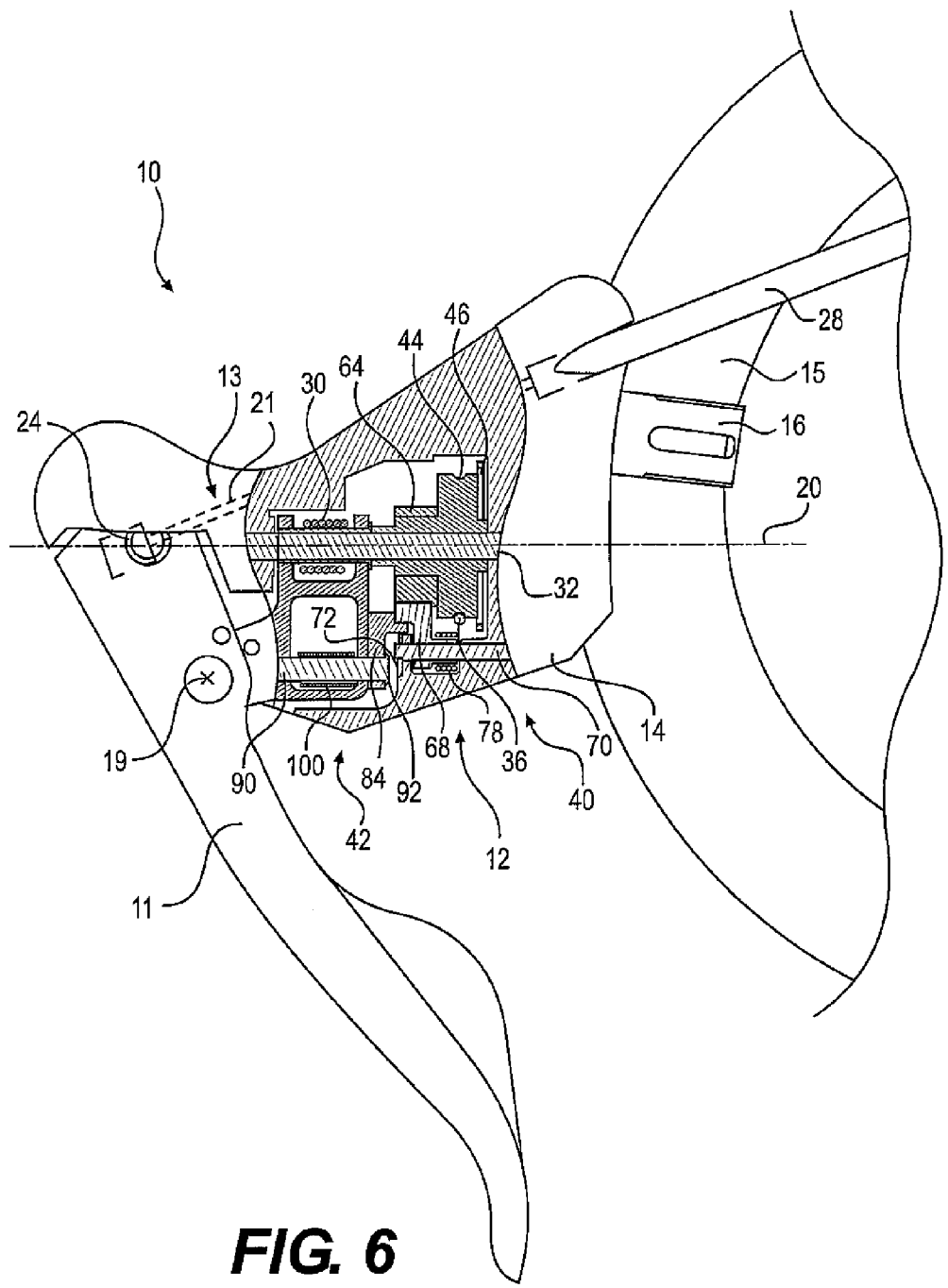
FIG. 6 is a partial cross-sectional view of the bicycle control device.

Looking to FIGS. 6-8, the ratchet wheel 64 includes a plurality of teeth 66 about its periphery, while the holding mechanism 40 includes a holding pawl 68 engageable with the teeth 66 to prevent unwinding of the takeup member 22. The ratchet wheel 64 is rotatably mounted to the shaft 32 and rotates with the takeup member 22. The ratchet wheel teeth 66 correspond to gear positions of the gear change mechanism. Alternatively, the ratchet wheel 64 and the takeup member 22 may be formed as single piece. The holding pawl 68 is rotatable about a holding pawl pivot 70 fixed to the housing 14 and is axially positioned by a retaining ring 72. The holding pawl 68 includes a body 74 and a nose 76 extending from the body 74. The holding pawl nose 76 is biased to engage the ratchet wheel teeth 66 by a preloaded holding pawl spring 78 coaxially mounted to the holding pawl pivot 70.

The drive mechanism 42 includes a drive pawl 84 rotatably mounted about a drive pawl pivot 90 fixed to the lever 11. The drive pawl 84 is axially positioned by a retaining ring 92. The drive pawl 84 includes a body 94, a nose 96 extending from the body 94 and a tail 98. A drive pawl spring 100 biases the drive pawl nose 96 toward the ratchet wheel teeth 66. The tail 98 of the drive pawl 84 rests against a declutching element, in this embodiment, a declutching wall 88 of the housing 14, when the lever 11 is in its rest position.

To shift the gear change mechanism, the lever 11 is rotated about the shift axis 20 in the shift direction S for a first shift movement to release the shift cable 36, and in the same direction for a second shift movement to pull the shift cable 36, the second shift movement being greater than the first shift movement. When the lever 11 is moved in the shift direction S, the brake control mechanism is not actuated. More specifically, the length x1 between the cable housing end 34 and the brake cable end portion 26 does not substantially change upon shift actuation because shift axis 20 substantially intersects the brake cable end portion 26 (see FIG. 5).

Figure 7A:
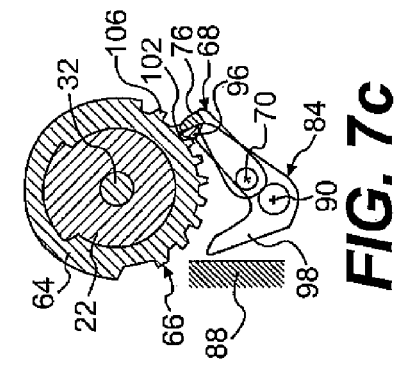
FIGS. 7a-7f are cross-sectional view of a holding mechanism and a drive mechanism at different stages of a cable-release operation.

Looking to FIGS. 7a-7f, a cable-release operation is described. Before the lever 11 is actuated, the tail 98 of the drive pawl 84 rests against the declutching wall 88, positioning the lever 11 in its rest position (FIG. 7a). Further, the takeup member 22 and the ratchet wheel 64 are retained in a selected gear position by the holding pawl 68, shown engaging a corresponding first tooth 102.

Figure 7D:
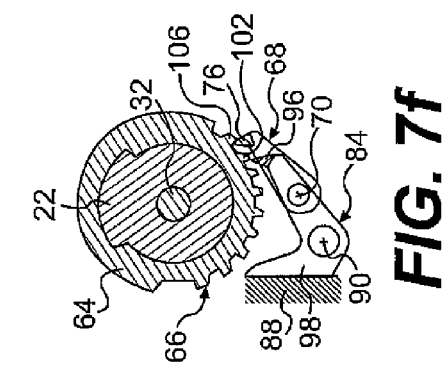
Figure 7B:
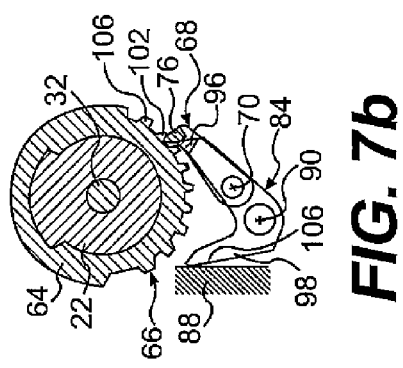

Looking to FIG. 7b, as the lever 11 is actuated by the rider, the lever 11 and the bracket 18 rotate about the shaft 32, moving the drive pawl 84 away from the declutching wall 88, and pivoting the drive pawl nose 96 toward the ratchet wheel teeth 66. Looking to FIG. 7c, as the lever 11 is further rotated, the drive pawl nose 96 engages the holding pawl nose 76, causing the holding pawl 68 to release the first tooth 102 of the ratchet wheel 64. Once released, the ratchet wheel 64 rotates about the shaft 32 in the cable-release direction, until the first tooth 102 engages the drive pawl nose 96. This action provides both audible and tactile feedback to the rider, signaling the rider to release the lever 11, if a cable-release operation is desired.

Figure 7E:
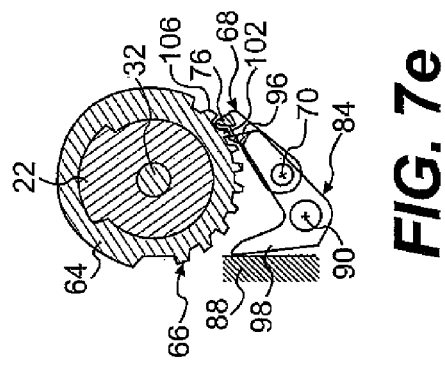
Figure 7C:
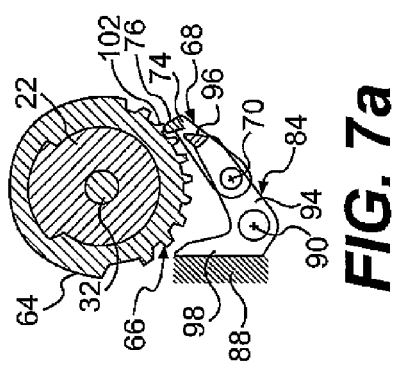
Figure 7F:
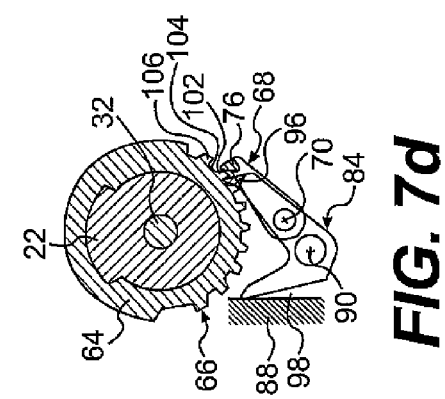

Looking to FIG. 7d, as the lever 11 is released, allowing it to pivot towards its rest position under the biasing force a lever return spring 30, the ratchet wheel 64 rotates in the cable-release direction. Further, the holding pawl nose 76 moves toward engagement with a recess 104 associated with an adjoining second tooth 106 of the ratchet wheel 64, and the drive pawl tail 98 moves toward engagement with the declutching wall 88. As the lever 11 rotates further toward its rest position, the drive pawl nose 96 pivots further away from the ratchet wheel teeth 66, due to the torque created as the drive pawl tail 98 bears against the declutching wall 88 (FIG. 7e). When the drive pawl 84 disengages from the ratchet wheel teeth 66, the ratchet wheel 64 rotates in the cable-release direction under the force of the shift cable 36 and the takeup member return spring 46, until the holding pawl nose 76 engages the second adjoining ratchet wheel tooth 106, resulting in a gear shift, by one gear increment, in the cable-release direction. At the end of the cable-release operation, the drive pawl 84 moves back to its rest position against the declutching wall 88 (FIG. 7f), positioning the lever 11 in its rest position.

Looking to FIGS. 8a-8h, a cable-pull operation is described. Before the lever 11 is actuated, the drive pawl tail 98 rests against the declutching wall 88, positioning the lever 11 in its rest position (FIG. 8a). So positioned, the ratchet wheel 64 is retained in a selected gear position with the holding pawl 68 engaging the first ratchet wheel tooth 102. As the lever 11 is actuated by the rider in the shift direction S, the drive pawl 84 moves away from the declutching wall 88, positioning the drive pawl nose 96 toward the ratchet wheel teeth 66 (FIG. 8b).

Looking to FIG. 8c, as the lever 11 is further rotated, the drive pawl nose 96 engages the holding pawl nose 76, driving the holding pawl nose 76 out of engagement with the first ratchet wheel tooth 102. Once released, the ratchet wheel 64 rotates in the cable-release direction until the first tooth 102 engages the drive pawl nose 96. As the lever 11 is further rotated in the shift direction S, the drive pawl 84 drives the ratchet wheel 64 in the cable-pull direction, as the holding pawl 76 free-clutches, the holding pawl nose freely sliding along the ratchet wheel teeth 66 (FIG. 8d).

Looking to FIG. 8e, as the lever 11 is further rotated, the drive pawl 84 further rotates the ratchet wheel 64 in the cable-pull direction until the holding pawl 68 engages a next third tooth 110 on the ratchet wheel 64, resulting in a single gear shift in the cable-pull direction. The rider may readily shift multiple gear increments in the cable-pull direction by simply continuing to move the lever 11 in the shift direction S, until the desired gear position is reached. Audible and tactile feedback is provided to the rider as each gear shift increment is passed.

Looking to FIG. 8f, after the desired gear position is reached, the rider releases the lever 11 causing the lever 11 and the drive pawl 84 to rotate toward their rest positions under the force of the lever return spring 30. As the lever 11 further rotates toward its rest position, the drive pawl tail 98 bears against the declutching wall 88, creating a torque that rotates the drive pawl 84 away from the ratchet wheel teeth 66 (FIG. 8g). Looking to FIG. 8h, the drive pawl 84 is in its rest position against the declutching wall 88, with the drive pawl nose 96 disengaged from the ratchet wheel 64.

While this invention has been described by reference to one or more embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A bicycle control device, comprising:
   a housing fixedly mountable to the bicycle;
   a brake control mechanism including a brake cable housing seated in the housing and a brake cable slidably disposed in the brake cable housing;
   a shift control mechanism operated in a cable-release direction and a cable-pull direction; and
   a lever having a rest position and rotatable about a brake axis to actuate the brake control mechanism, wherein the lever is rotatable relative to the housing about a single shift axis to actuate the shift control mechanism in the cable-release direction and in the cable-pull direction,
   the bicycle control device not displacing the single shift axis relative to the housing upon actuation of the brake control mechanism, wherein the lever includes a brake cable receiving portion for receiving a distal end of the brake cable of the brake control mechanism and wherein the single shift axis intersects the distal end of the brake cable when the lever is in the rest position.

2. The bicycle control device of claim 1 wherein the lever is movable in a single shift direction to actuate the shift control mechanism in the cable-release direction and the cable-pull direction, the lever movable in a brake direction to actuate the brake control mechanism.

3. The bicycle control device of claim 2 wherein the lever is movable in the single shift direction from the rest position for a first shift movement to actuate the shift control mechanism in the cable-release direction, the lever movable in the single shift direction from the rest position for a second shift movement to actuate the shift control mechanism in the cable-pull direction, the second shift movement being greater than the first shift movement.

4. The bicycle control device of claim 1 wherein the brake axis is substantially perpendicular to the single shift axis.

5. The bicycle control device of claim 1 wherein the shift control mechanism includes a cable spool rotatable in the cable-release direction and the cable-pull direction about the single shift axis.

6. The bicycle control device of claim 1, wherein the cable receiving portion rotates with the lever when the lever operates the shift control mechanism.

7. A bicycle control device comprising:
a housing fixedly mountable to the bicycle;
a brake control mechanism including a brake cable housing seated in the housing and a brake cable slidably disposed in the brake cable housing;
a shift control mechanism operated in a cable-release direction and a cable-pull direction; and
a lever having a rest position and wherein the lever is rotatable about a single shift axis to actuate the shift control mechanism, and rotatable about a brake axis to actuate the brake control mechanism, wherein the lever includes a brake cable receiving portion for receiving a distal end of the brake cable of the brake control mechanism and wherein the single shift axis intersects the brake cable receiving portion when the lever is in the rest position, wherein the cable receiving portion rotates with the lever when the lever operates the shift control mechanism;
the lever movable in a single shift direction from the rest position for a first shift movement to actuate the shift control mechanism in the cable-release direction,
the lever movable in the single shift direction from the rest position for a second shift movement to actuate the shift control mechanism in the cable-pull direction, the second shift movement being greater than the first shift movement.

8. The bicycle control device of claim 7 wherein the brake axis is substantially perpendicular to the single shift axis.

9. The bicycle control device of claim 7 wherein the shift control mechanism includes a cable spool rotatable in the cable-release direction and the cable-pull direction about the single shift axis.

10. A bicycle control device comprising:
a housing fixedly mountable to the bicycle;
a brake control mechanism including a brake cable housing seated in the housing and a brake cable slidably disposed in the brake cable housing;
a shift control mechanism operated in a cable-release direction and a cable-pull direction; and
a lever having a rest position and wherein the lever is rotatable relative to the housing about a single shift axis to actuate the shift control mechanism in the cable-release direction and the cable-pull direction and rotatable about a brake axis to actuate the brake control mechanism,
the lever including a brake cable receiving portion for receiving a distal end of the brake cable, the single shift axis intersecting the distal end of the brake cable when the lever is in the rest position, the brake cable receiving portion rotated about the single shift axis during lever rotation about the single shift axis to actuate the shift control mechanism.

11. The bicycle control device of claim 10 wherein the lever is movable in a shift direction to actuate the shift control mechanism and moveable in a brake direction to actuate the brake control mechanism.

12. The bicycle control device of claim 10 wherein the brake axis is substantially perpendicular to the shift axis.

13. The bicycle control device of claim 10 wherein the shift control mechanism includes a cable spool rotatable in the cable-release direction and the cable-pull direction about the shift axis.

* * * * *